US011558486B1

(12) United States Patent
Darden et al.

(10) Patent No.: US 11,558,486 B1
(45) Date of Patent: Jan. 17, 2023

(54) INFINITE CALL LOOP PREVENTION SYSTEM

(71) Applicant: Toshiba Global Commerce Solutions, Inc., Durham, NC (US)

(72) Inventors: Zachary M. Darden, Apex, NC (US); Jonathan Waite, Apex, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 17/560,448

(22) Filed: Dec. 23, 2021

(51) Int. Cl.
*H04L 67/568* (2022.01)
*H04L 67/51* (2022.01)

(52) U.S. Cl.
CPC .......... *H04L 67/568* (2022.05); *H04L 67/51* (2022.05)

(58) Field of Classification Search
CPC .............................. H04L 67/568; H04L 67/51
USPC ........................................................ 709/206
See application file for complete search history.

(56) References Cited

U.S. PATENT DOCUMENTS

| | | | | |
|---|---|---|---|---|
| 2003/0041207 | A1* | 2/2003 | Kamakura | G06F 13/128 710/305 |
| 2010/0299437 | A1* | 11/2010 | Moore | H04L 67/1008 709/224 |
| 2012/0069980 | A1* | 3/2012 | Wall | H04Q 3/0016 379/142.04 |
| 2014/0122450 | A1* | 5/2014 | Kawai | G06F 11/1453 707/692 |

FOREIGN PATENT DOCUMENTS

EP  0992910 A1 *  4/2000

OTHER PUBLICATIONS

Joydip Kanjilal, Consider these key microservices caching strategies, Mar. 2, 2020. techtarget.com, https://www.techtarget.com/searchapparchitecture/tip/Consider-these-key-microservices-caching-strategies (Year: 2020).*

StackExchange, Avoiding infinite loops in SOA / Enterprise Integration messaging, Aug. 31, 2020, stackexchange.com, https://softwareengineering.stackexchange.com/questions/415398/avoiding-infinite-loops-in-soa-enterprise-integration-messaging (Year: 2020).*

(Continued)

*Primary Examiner* — Zi Ye
(74) *Attorney, Agent, or Firm* — Kaufman & Canoles, P.C.

(57) ABSTRACT

Systems and methods of identifying infinite call loops using custom tracking headers are provided. In one exemplary embodiment, a method is performed by a first instance of a microservice operated by a first network node in a distributed microservice system having instances of one or more microservices operated by network nodes with each instance having a data cache operable to share data between instances of that microservice. The method includes receiving an indication that includes a message to access data that may be available in a data cache of an instance of the microservice, the indication also including one or more tracking identifiers with each tracking identifier corresponding to an instance of the microservice that successively sends or receives the message so as to determine that the message corresponds to a same message previously sent or received by the same instance of the microservice.

19 Claims, 8 Drawing Sheets

(56) References Cited

OTHER PUBLICATIONS

Kanjilal, "The vicious cycle of circular dependencies in microservices," <https://www.techtarget.com/searchapparchitecture/tip/The-vicious-cycle-of-circular-dependencies-in-microservices> webpage published Nov. 17, 2020 (4 pages).

Sampaio, et al., "Improving microservice-based applications with runtime placement adaptation," Journal of Internet Services and Applications, <https://jisajournal.springeropen.com/articles/10.1186/s13174-019-0104-0> vol. 10. No. 4, published online Feb. 26, 2019 (30 pages).

Unknown, "Microservice feign infinite loop of invocations?" <https://stackoverflow.com/questions/57541355/microservice-feign-infinite-loop-of-invocations> wepbage published Aug. 18, 2019 (3 pages).

Wikipedia, "Spanning Tree Protocol," <https://en.wikipedia.org/wiki/Spanning_Tree_Protocol> webpage available at least as early as Oct. 3, 2002 (14 pages).

* cited by examiner

INFINITE CALL LOOP PREVENTION SYSTEM

BACKGROUND

A microservice architecture typically is a single application developed as a suite of small, independent functions (e.g., services) that work together via application programming interfaces (APIs). The services of the microservice architecture are decentralized which can present issues (e.g., misconfigurations) with decentralized data management. In distributed microservice environment, it is increasingly important to identify misconfigurations of the microservice architecture in order to obviate catastrophic cluster hang and system failure during execution. In production testing of the application, misconfigurations may be due to the service running at multiple instances/locations of the distributed microservice environment. Furthermore, configuration changes deployed to the distributed microservice environment associated with call chains may contribute to the misconfigurations.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Various embodiments of the present disclosure include a distributed microservice environment. The distributed microservice environment may include a plurality of network nodes. Each of the plurality of network nodes is configured to operate an instance of the same microservice. The distributed microservice environment may include a near/far cache configuration. For example, if a first network node operating an instance of a microservice receives, from a second network node operating an instance of the same microservice, a microservice call for data of that microservice and the data is not stored in a local data cache of the first network node, then the first network node will send a second call to a third network node operating an instance of the same microservice to request the data from the local data cache of the third network node. As such, this process permits repeat calls by the microservices in the distributed microservice environment as many times as the chain configuration of the distributed microservice environment allows. Thus, a misconfiguration in the distributed microservice environment may cause error conditions associated with infinite call loops that cause catastrophic cluster hangs and eventual system crashes.

Accordingly, there is a need for improved techniques for identifying infinite call loops in a distributed microservice environment so that the distributed microservice environment may dismiss the infinite call loops prior to causing cluster hangs that would crash the network nodes operating the corresponding microservice(s) of the distributed microservice environment. In addition, other desirable features and characteristics of the present disclosure will become apparent from the subsequent detailed description and embodiments, taken in conjunction with the accompanying figures and the foregoing technical field and background.

Figure 1:
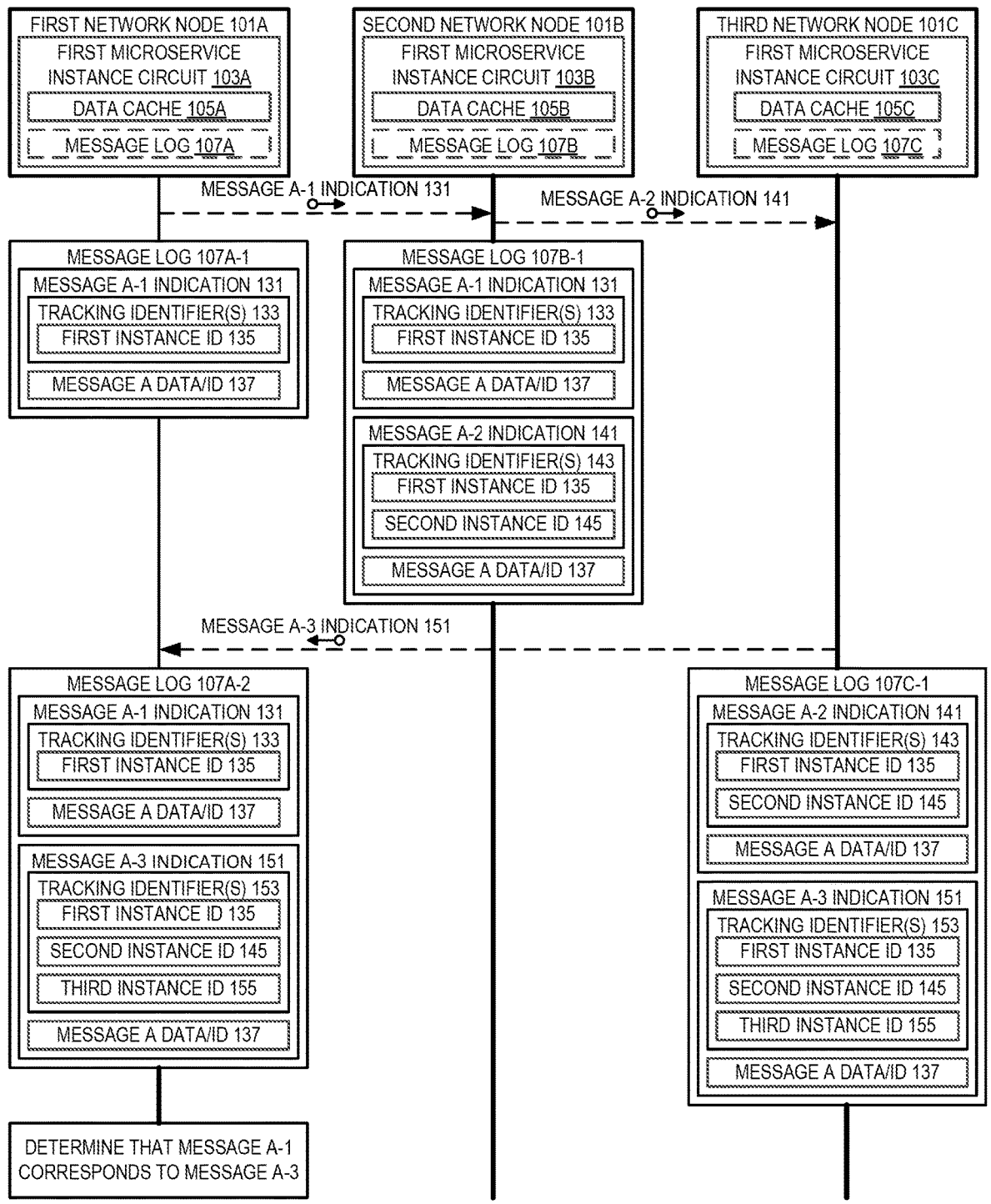
FIG. 1 illustrates one embodiment of a system of preventing infinite call loops using custom tracking headers in a microservice call in accordance with various aspects as described herein.

In the present disclosure, systems and methods of identifying and preventing infinite call loops using custom tracking headers in a microservice call are provided. In one embodiment, FIG. 1 illustrates one embodiment of a system 100 of identifying and preventing infinite call loops using custom tracking headers in a microservice call in accordance with various aspects as described herein. In FIG. 1, the system 100 includes a first network node 101A (e.g., local server), a second network node 101B (e.g., regional server), and a third network node 101C (e.g., enterprise server). The first network node 101A includes a first microservice instance circuit 103A. The first microservice instance circuit 103A includes a data cache 105A and a message log 107A. The data cache 105A includes certain data related to a function of the first microservice instance circuit 103A. The message log 107A includes a log of one or more messages that the first network node 101A sends or receives. For example, the message log 107A may include a message log 107A-1 at a first time that includes message A-1 and a message log 107A-2 at a second time that occurs after the first time.

In the current embodiment, the message log 107A-1 includes a message A-1 indication 131, which corresponds to a request for certain data related to the first microservice instance circuit 103A that the first network node 101A transmits to the second network node 101B. Also, the message A-1 indication 131 may include tracking identifier(s) 133 and a message A data/ID 137. In one example, an ID associated with the message A data/ID 137 may be associated with data integrity information of the message A data/ID 137 such as a checksum, a cyclic redundancy check (CRC) value, or the like. In this example, the tracking identifier(s) 133 includes a first instance ID 135, which is an identifier associated with the first microservice instance circuit 103A that sent the message A-1 indication 131. In one example, an instance ID may be a host identifier, a port identifier, Internet Protocol (IP) address, or the like.

Additionally, the message A data/ID 137 may correspond to a request for certain data related to the function of the first microservice instance circuit 103A (e.g., data that may be stored in the data cache 105A). In this example, the message log 107A-2 includes the message A-1 indication 131 and a message indication A-3 151, which corresponds to a request for certain data related to the first microservice instance circuit 103A that a third network node 101C sends to the first network node 101A. Also, the message indication A-3 151 includes tracking identifier(s) 153 and the message A data/ID 137. In this example, the tracking identifier(s) 153 includes the first instance ID 135, a second instance ID 145, and a third instance ID 155. The second instance ID 145 is an identifier associated with a message A-2 indication 141, which corresponds to a request for certain data related to a first microservice instance circuit 103B that the second network node 101B sends to the third network node 101C. The third instance ID 155 is an identifier associated with a message A-3 indication 151, which corresponds to a request for certain data related to a first microservice instance circuit 103C that the third network node 101C sends to the first network node 101A.

In FIG. 1, the second network node 101B includes the first microservice instance circuit 103B. The first microservice instance circuit 103B includes a data cache 105B and a message log 107B. The data cache 105B includes the requested data related to a function of the first microservice instance circuit 103A. The message log 107B includes a log of one or more messages the second network node 101B sends or receives. For example, the message log 107B includes a message log 107B-1 at a certain time. In this example, the message log 107B-1 includes the message A-1 indication 131 and the message A-2 indication 141. Also, the message A-2 indication 141 includes tracking identifier(s) 143 and the message A data/ID 137. The tracking identifier(s) 143 includes the first instance ID 135 of the message A-1 indication 131 and the second instance ID 145 of the message A-2 indication 141. The second instance ID 145 is an identifier associated with the message A-2 indication 141 and the first microservice instance circuit 103B. In some implementations, prior to transmitting the message A-2 indication 141, the second network node 101B appends or concatenates the first instance ID 135 to a header of the message A-2 indication 141 in addition to the second instance ID 145.

Additionally, in FIG. 1, the third network node 101C includes the first microservice instance circuit 103C. The first microservice instance circuit 103C includes a data cache 105C and a message log 107C. The data cache 105C includes the requested data related to a function of the first microservice instance circuit 103A and the first microservice instance circuit 103B. The message log 107C includes a log of one or more messages the third network node 101C sends or receives. For example, the message log 107C includes a message log 107C-1. In this example, the message log 107C-1 includes the message A-2 indication 141 and the message A-3 indication 151. In some implementations, prior to sending the message A-3 indication 151, the third network node 101C appends, concatenates, or the like the first instance ID 135 and the second instance ID 145 to a header of the message A-3 indication 151 in addition to the third instance ID 155.

In some embodiments, the system 100 uses a tracking identifier(s) of the message log 107A, the message log 107B, the message log 107C, or content of the message A-1 indication 131, the message A-2 indication 141, the message A-3 indication 151 to determine whether the first network node 101A, the second network node 101B, or the third network node 101C has previously received a request for the certain data in accordance with various aspects as described herein.

Figure 2A:
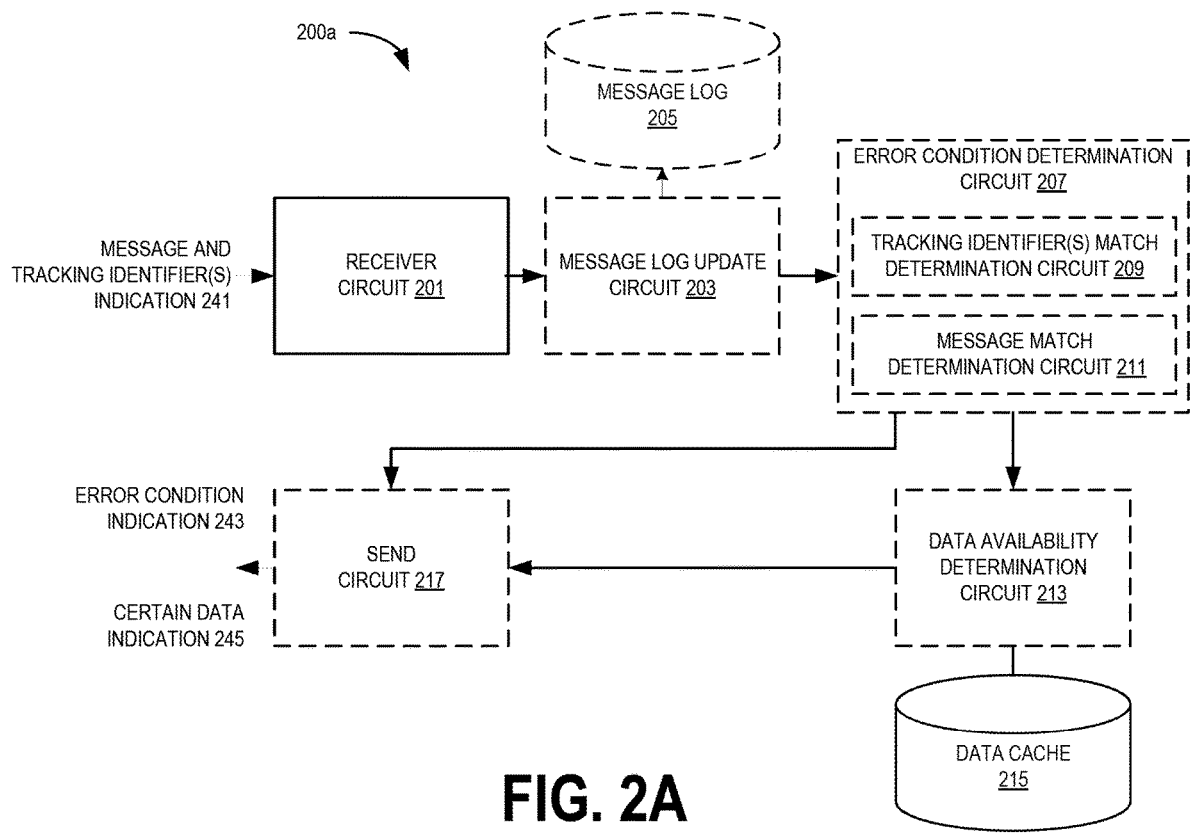
FIG. 2A illustrates one embodiment of a first network node operating a microservice in accordance with various aspects as described herein.

FIG. 2A illustrates one embodiment of a first network node device 200a in accordance with various aspects as described herein. In FIG. 2A, the device 200a implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) herein) may include for instance: a receiver circuit 201 operable to receive a message and tracking identifier(s) indication 241; a message log update circuit 203 operable to update a log of a message log 205 with the message and tracking identifier(s) indication 241; the message log 205 operable to store updates the message log update circuit 203 provides; an error condition determination circuit 207 operable to generate an error condition indication 243 responsive to determining the device 200a previously received the message and tracking identifier(s) indication 241; a tracking identifier(s) match determination circuit 209 operable to determine a match of an identifier of a tracking identifier of the message log 205 and the message and tracking identifier(s) indication 241; a message match determination circuit 211 operable to determine a match of content of a message of the message log 205 and the message and tracking identifier(s) indication 241; a data availability determination circuit 213 operable to generate a certain data indication 245 responsive to determining availability of certain data corresponding to the message and tracking identifier(s) indication 241 in a data cache 215 based on the message and tracking identifier(s) indication 241; a send circuit 217 operable to send, to a network node device that sent the message and tracking identifier(s) indication 241, the error condition indication 243 or the certain data indication 245.

Figure 2B:
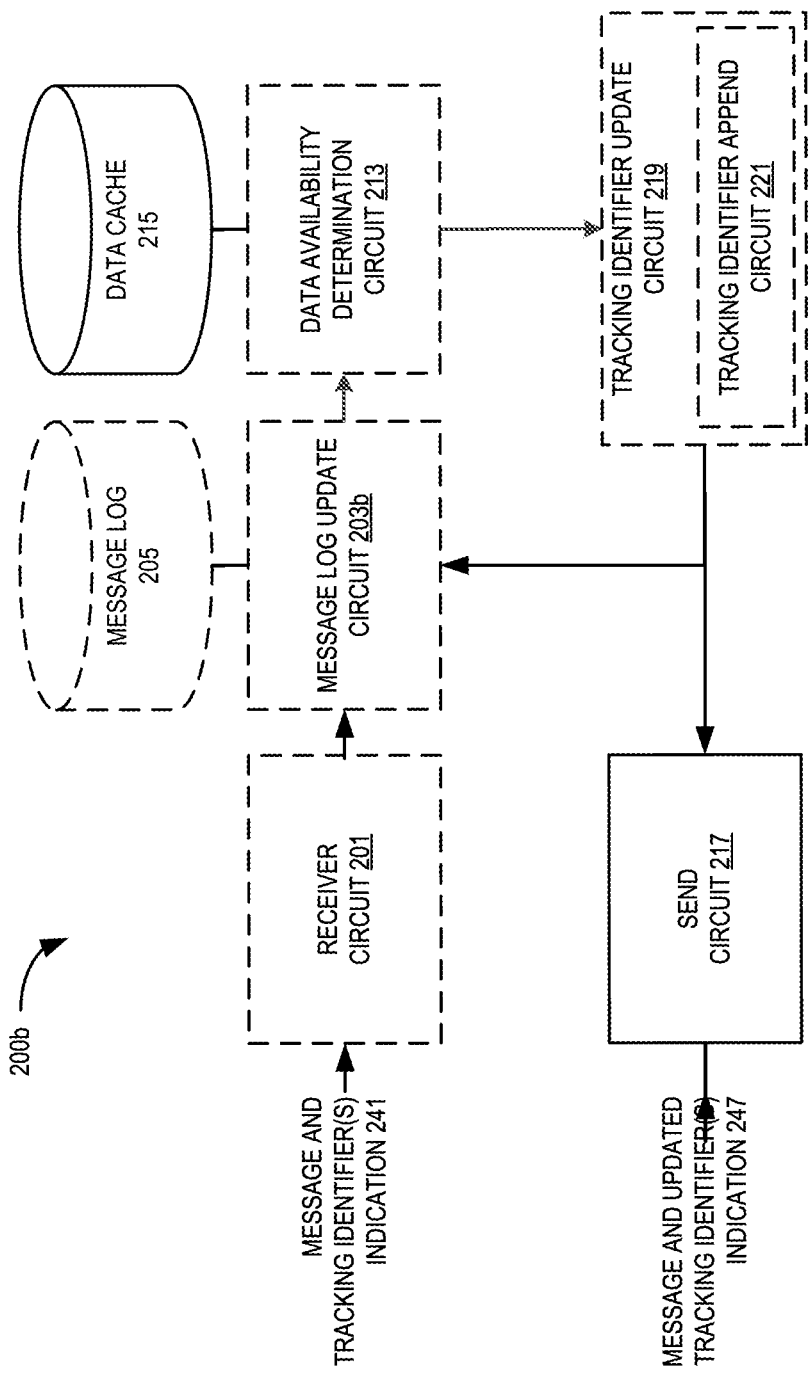
FIG. 2B illustrates one embodiment of a second network node operating a microservice in accordance with various aspects as described herein.

FIG. 2B illustrates one embodiment of a second network node device 200b in accordance with various aspects as described herein. In FIG. 2B, the device 200b implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) herein) may include for instance: the receiver circuit 201 operable to receive the message and tracking identifier(s) indication 241; a message log update circuit 203b operable to update the log of the message log 205 with the message and tracking identifier(s) indication 241 or a message and updated tracking identifier(s) indication 247; the message log 205 operable to store updates the message log update circuit 203b provides; the data availability determination circuit 213 operable to determine that the certain data corresponding to the message and tracking identifier(s) indication 241 is not stored in the data cache 215 based on the message and tracking identifier(s) indication 241; a tracking identifier update circuit 219 operable to generate the message and updated tracking identifier(s) 247; a tracking identifier append circuit 221 operable to append an identifier associated with the device 200b to the message and tracking identifier(s) indication 241; the send circuit 217 operable to send, to a network node device, the message and updated tracking identifier(s) indication 247.

Figure 3A:
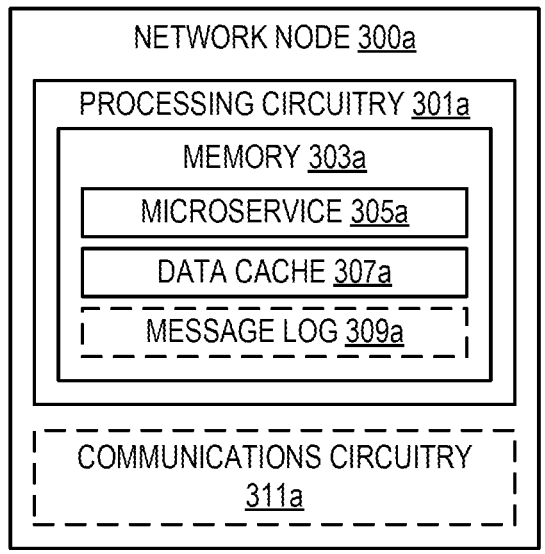
FIGS. 3A-C illustrate other embodiments of a network node operating a microservice in accordance with various aspects as described herein.
Figure 3B:
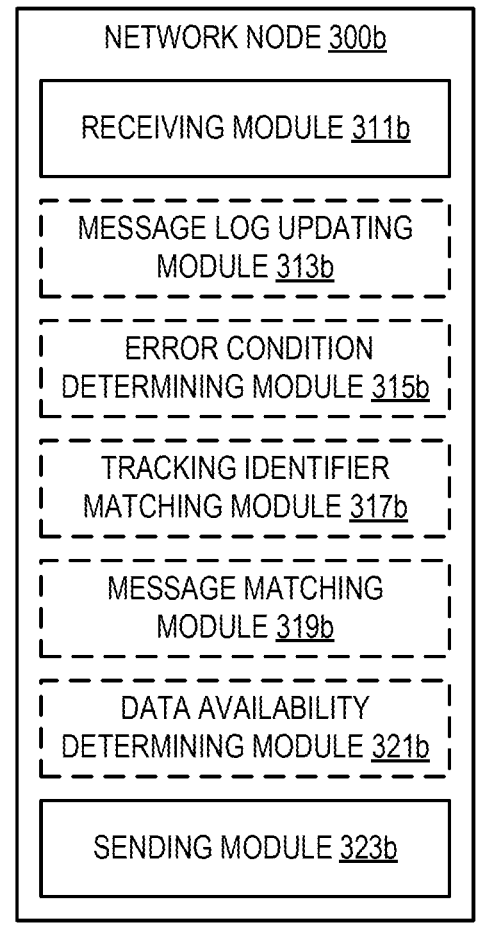
Figure 3C:
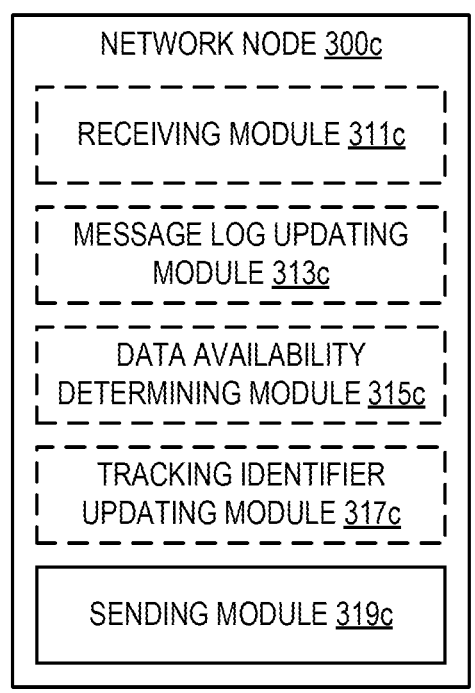

FIGS. 3A-C illustrate other embodiments of a network node device 300a-c in accordance with various aspects as described herein. In FIG. 3A, the device 300a may include processing circuitry 301a that is operably coupled to one or more of the following: memory 303a, microservice 305a, data cache 307a, message log 309a, communications circuitry 311a, the like, or any combination thereof. The communication circuitry 311a is configured to transmit and/or receive information to and/or from one or more other nodes via any communication technology. The processing circuitry 301a is configured to perform processing described herein, such as by executing instructions stored in memory 303a. The processing circuitry 303a in this regard may implement certain functional means, units, or modules. The microservice 305a is configured to provide a function of an application. The data cache 307a is configured to store and provide certain data the microservices 305a utilizes in providing a function of the application. The message log 309a is configured to store messages, tracking identifiers, and content of messages sent and received by the device 300a.

Figure 5:
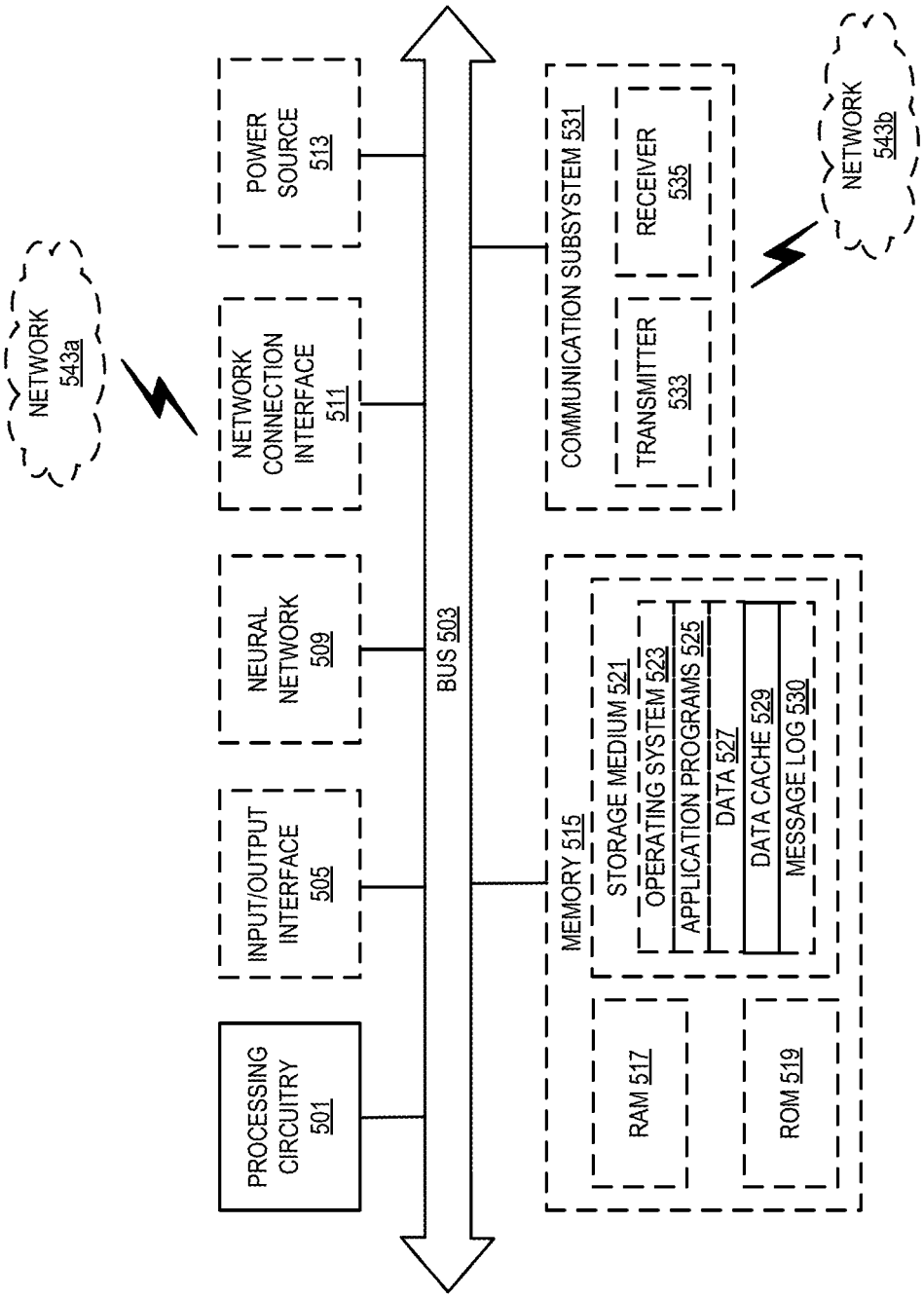
FIG. 5 illustrates another embodiment of a network node operating a microservice in accordance with various aspects as described herein.

In FIG. 3B, the device 300b implements various functional means, units, or modules (e.g., via the processing circuitry 301a in FIG. 3A, via the processing circuitry 501 in FIG. 5, via software code, or the like). In one embodiment, these functional means, units, or modules (e.g., for implementing the method(s) described herein) may include for instance: a receiving module 311b for receiving, from a network node operating a same microservice, an indication that includes a message to access certain data; a message log updating module 313b for updating a log of messages sent or received by the device 300b to include the message, an identifier of the message and/or the one or more tracking identifiers of that message; an error condition determining module 315b for determining that the message corresponds to the same message previously sent or received by the device 300b based on the one or more tracking identifiers of the message and one or more tracking identifiers of previous messages of the log of messages; a tracking identifier matching module 317b for determining that at least one of the one or more tracking identifiers of the message corresponds to at least one of the one or more tracking identifiers of the log of messages or determining that a sequence of the one or more tracking identifiers of a previous message of the log of messages corresponds to a sequence of at least a portion of the one or more tracking identifiers of the message; a message matching module 319b for determining that content of the message corresponds to content of a previous message of the log of messages; a data availability determining module 321b for determining that the certain data is available in a data cache of the device 300b; and a sending module 323b for sending, to the network node operating the same microservice, an indication that the message is associated with an error condition or the certain data responsive to determining that the certain data is available in the data cache of the device 300b.

In FIG. 3C, the device 300c implements various functional means, units, or modules (e.g., via the processing circuitry 301a in FIG. 3A, via the processing circuitry 501 in FIG. 5, via software code, or the like). In one embodiment, these functional means, units, or modules (e.g., for implementing the method(s) described herein) may include for instance: a receiving module 311c for receiving, from a network node operating a same microservice, an indication that includes a message to access certain data; a message log updating module 313c for updating a log of messages sent or received by the device 300c to include the message, an identifier of the message and/or the one or more tracking identifiers of that message; a data availability determining module 315c for determining that the certain data is not available in a data cache of the device 300c; a tracking identifier updating module 317c for responsive to determining the certain data is not available in a data cache of the device 300c, updating the one or more tracking identifiers of the message to include a tracking identifier of the device 300c by appending the tracking identifier of the device 300c to the one or more tracking identifiers of the message; and a sending module 319c for sending, to the network node operating the same microservice, an indication that includes the message with updated tracking identifiers to access the certain data that may be available in a data cache of the network node operating the same microservice.

Figure 4A:
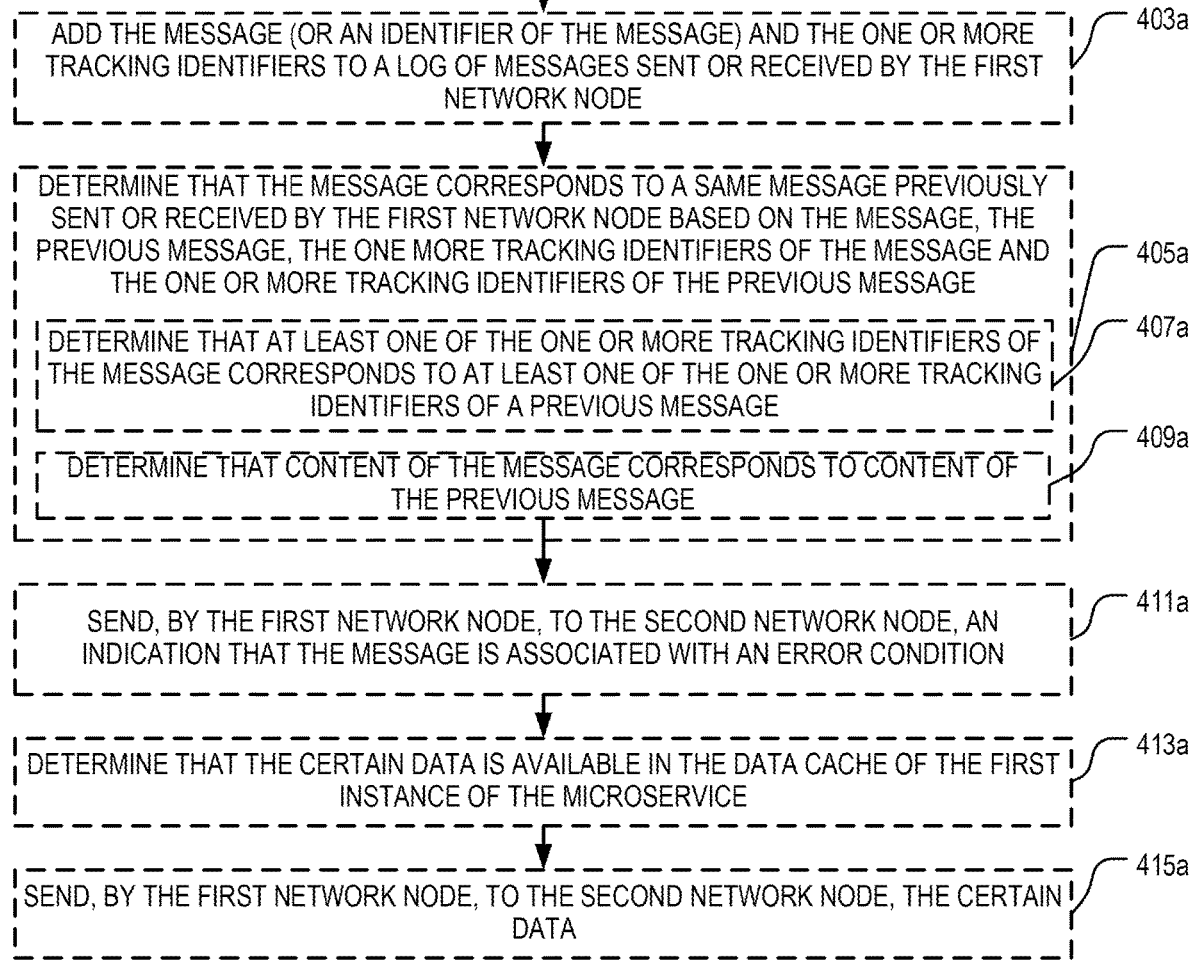
FIG. 4A illustrates one embodiment of a method of preventing infinite call loops using custom tracking headers in a microservice call in accordance with various aspects as described herein.

FIG. 4A illustrates one embodiment of a method 400a of identifying infinite call loops using custom tracking headers in a microservice call in accordance with various aspects as described herein. In FIG. 4A, at block 401a the process includes receiving, by a first instance of a microservice operated by a first network node, from a second instance of a same microservice operated by a second network node, an indication that includes a message to access certain data that may be available in a data cache of an instance of the microservice. Also, the indication includes one or more tracking identifiers. Each tracking identifier of the one or more tracking identifiers corresponds to an instance of the microservice that successively sends or receives the message. In addition, each tracking identifier may include a host identifier and a port identifier associated with the corresponding instance of the microservice. At block 403a, the method 400a includes updating a log of messages sent or received by the first instance. The log includes the message or an identifier of the message and the one or more tracking identifiers of that message.

At block 405a, the method 400a includes determining that the message corresponds to a same message previously sent or received by the same instance of the microservice based on the message, the previous message, the one more tracking identifiers of the message, and the one or more tracking identifiers of the previous message. Additionally, the method 400a includes determining that a sequence of the one or more tracking identifiers of the previous message corresponds to a sequence of at least a portion of the one or more tracking identifiers of the message. Also, at block 407a, the method 400a includes determining that at least one of the one or more tracking identifiers of the message corresponds to at least one of the one or more tracking identifiers of the previous message. Furthermore, at block 409a, the method 400a includes determining that content of the message corresponds to content of the previous message.

In response to determining that the message corresponds to a same message previously sent or received by the same instance of the microservice, the method 400a includes sending, by the first instance of the microservice of the first network node, to the second instance of the microservice of the second network node, an indication that the message is associated with an error condition, as represented by block 411a. The error condition may be associated with the same message being sent or received by an instance of the microservice prior to that instance receiving a response or acknowledgement to any of the sent or received messages. Also, the error condition may be associated with an infinite call loop.

At block 413a, the method 400a includes determining that the certain data is available in the data cache of the first instance of the microservice. In response to determining that the certain data is available in the data cache of the first instance of the microservice, the method 400a includes sending, by the first instance of the microservice of the first network node, to the second instance of the microservice of the second network node, the certain data, as represented by block 415a. In some implementations, the method 400a includes sending certain data to each instance of a microservice that successively sent or received a message associated with the certain data using one or more tracking identifiers with each tracking identifier corresponding to the instance of the microservice.

Figure 4B:
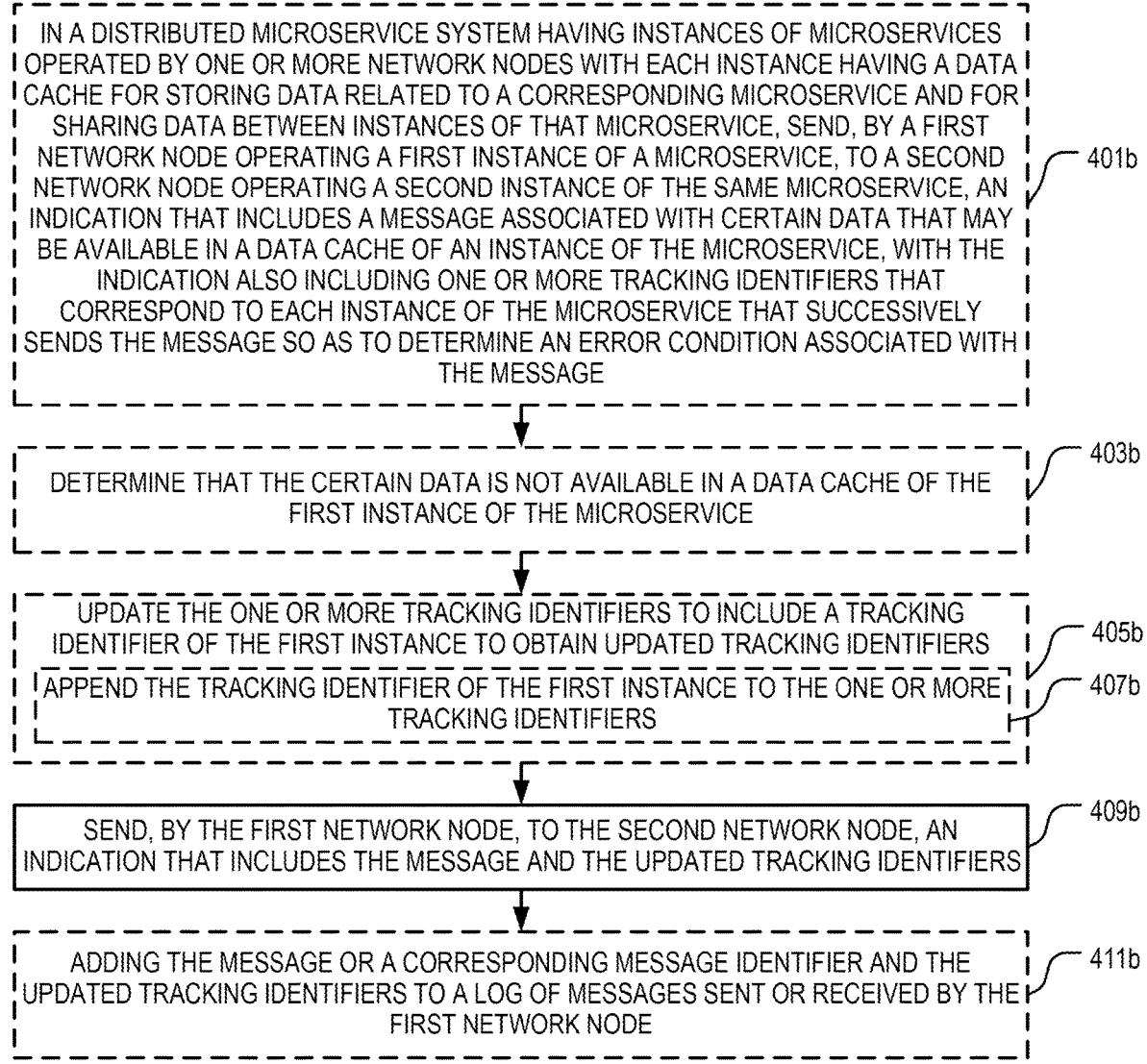
FIG. 4B illustrates one embodiment of a method of identifying infinite call loops using custom tracking headers in a microservice call in accordance with various aspects as described herein.

FIG. 4B illustrates another embodiment of a method 400b of identifying infinite call loops using custom tracking headers in a microservice call in accordance with various aspects as described herein. In FIG. 4B, at block 401b the process includes sending, by a first instance of a microservice operated by a first network node, to a second instance of a same microservice operated by a second network node, an indication that includes a message to access certain data that may be available in a data cache of an instance of the microservice. The indication also including one or more tracking identifiers with each tracking identifier corresponding to an instance of the microservice that successively sends or receives the message. Each tracking identifier may include a host identifier and a port identifier associated with the corresponding network node At block 403b, the method 400b includes determining that the certain data is not available in the data cache of the first instance of the microservice. At block 405b, the method 400b includes updating the one or more tracking identifiers to include a tracking identifier of the first instance to obtain updated tracking identifiers. Also, at block 407b, the method 400b includes appending the tracking identifier of the first instance of the microservice to the one or more tracking identifiers.

In response to determining that the certain data is not available in the data cache of the first instance of the microservice sending, by the first instance of the microservice operated by the first network node, to the second instance of the same microservice operated by the second network node, the indication that includes a message that certain data that is not available in the data cache of the first instance of the microservice, as represented by block 409b. The indication also including the one or more tracking identifiers with each tracking identifier corresponding to an instance of the microservice that successively sends or receives the message. At block 411b, the method 400 includes updating a log of messages sent or received by the first network node to include the message or an identifier of the message and the one or more tracking identifiers.

FIG. 5 illustrates another embodiment of a network node device 500 in accordance with various aspects as described herein. In FIG. 5, the device 500 includes processing circuitry 501 that is operatively coupled to input/output interface 505, neural network circuit 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, data 527, data cache 529, and message log 530. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500 may be configured to use an output device via input/output interface 505. An output device may use the same type of interface port as an input device. For example, a USB port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, the neural network 509 may be configured to learn to perform tasks by considering examples. In one example, the neural network 509 may learn to identify patterns of delay in a distributed microservice environment. Further, the neural network 509 may learn to distributes network or application traffic across a number of nodes of the distributed microservice environment. In response to detecting a pattern of delay, the processing circuitry 501 may direct a microservice call to an available node of the distributed microservice environment. The network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as a widget or gadget engine or another application, a data file 527, a data cache 529, and a message log 530. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 5, the processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500.

The features, benefits and/or functions described herein may be implemented in one of the components of the device 500 or partitioned across multiple components of the device 500. Further, the features, benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one embodiment, a distributed microservice environment includes a first network node operating a first instance of a microservice, a second network node operating the first instance of the microservice, and a third network node operating the first instance of the microservice. In this embodiment, the first network node is configured to transmit calls for certain data associated with the first instance of the microservice to the second network node. Additionally, the second network node is configured to transmit calls for certain data associated with the first instance of the microservice to the third network node. Also, the third network node is configured to transmit calls for certain data associated with the first instance of the microservice to the first network node. Also, each network node is configured to append an identifier to each call each network node transmits or receives and logs each call in a respective data cache of each network node. In one scenario, the first network node receives a microservice call for certain data corresponding to the first instance of the microservice from the third network node. If the first network node determines that the call corresponds to the same call the first network node previously sent, then the first network node sends an indication to the third network node that the call is associated with an error.

In one exemplary embodiment, a method comprises, in a distributed microservice system having instances of one or more microservices operated by network nodes with each instance having a data cache operable to share data between instances of that microservice, receiving, by a first instance of a microservice operated by a first network node, from a second instance of a same microservice operated by a second network node, an indication that includes a message to access certain data that may be available in a data cache of an instance of the microservice, the indication also including one or more tracking identifiers with each tracking identifier corresponding to an instance of the microservice that successively sends or receives the message so as to determine that the message corresponds to a same message previously sent or received by the same instance of the microservice based on the one or more tracking identifiers of the message and the one or more tracking identifiers of the previous message.

In another exemplary embodiment, the method further includes updating a log of messages sent or received by the first instance to include the message or an identifier of the message and the one or more tracking identifiers of that message.

In another exemplary embodiment, the method further includes determining that the message corresponds to the same message previously sent or received by the first instance based on the one or more tracking identifiers of the message and the one or more tracking identifiers of the previous message.

In another exemplary embodiment, the method further includes determining that at least one of the one or more tracking identifiers of the message corresponds to at least one of the one or more tracking identifiers of the previous message.

In another exemplary embodiment, the method further includes determining that a sequence of the one or more tracking identifiers of the previous message corresponds to a sequence of at least a portion of the one or more tracking identifiers of the message.

In another exemplary embodiment, the method further includes determining that content of the message corresponds to content of the previous message.

In another exemplary embodiment, the method further includes sending, by the first instance of the microservice of the first network node, to the second instance of the microservice of the second network node, an indication that the message is associated with an error condition.

In another exemplary embodiment, the error condition is associated with the same message being sent or received by an instance of the microservice prior to that instance receiving a response or acknowledgement to any of the sent or received messages.

In another exemplary embodiment, the error condition is associated with an infinite call loop.

In another exemplary embodiment, the method further includes sending, by the first instance of the microservice of the first network node, to the second instance of the microservice of the second network node, the certain data responsive to determining that the certain data is available in the data cache of the first instance of the microservice.

In another exemplary embodiment, each tracking identifier includes a host identifier and a port identifier associated with the corresponding instance of the microservice.

In one exemplary embodiment, a first network node comprises a processor and a memory, the memory containing instructions executable by the processor whereby the processor is configured to, in a distributed microservice system having instances of one or more microservices operated by network nodes with each instance having a data cache operable to share data between instances of that microservice, receive, by a first instance of a microservice operated by the first network node, from a second instance of the same microservice operated by a second network node, an indication that includes a message to access certain data that may be available in a data cache of an instance of the microservice. Further, the indication also includes one or more tracking identifiers with each tracking identifier corresponding to an instance of the microservice that successively sends or receives the message so as to determine that the message corresponds to a same message previously sent or received by the same instance of the microservice based on the one more tracking identifiers of the message and the one or more tracking identifiers of the previous message.

In one exemplary embodiment, a method, comprises, in a distributed microservice system having instances of one or more microservices operated by network nodes with each instance having a data cache operable to share data between instances of that microservice, sending, by a first instance of a microservice operated by a first network node, to a second instance of a same microservice operated by a second network node, an indication that includes a message to access certain data that may be available in a data cache of an instance of the microservice. Further, the indication also includes one or more tracking identifiers with each tracking identifier corresponding to an instance of the microservice that successively sends or receives the message so as to determine that the message corresponds to a same message previously sent or received by the same instance of the microservice based on the one more tracking identifiers of the message and the one or more tracking identifiers of the previous message.

In another exemplary embodiment, the method further includes receiving, by the first instance of the microservice operated by the first network node, from a third instance of the microservice operated by a third network node, an indication that includes the message and a portion of the one or more tracking identifiers.

In another exemplary embodiment, the sending step is responsive to determining that the certain data is not available in the data cache of the first instance of the microservice.

In one exemplary embodiment, the method includes updating the one or more tracking identifiers to include a tracking identifier of the first instance to obtain updated tracking identifiers.

In another exemplary embodiment, the updating step includes appending the tracking identifier of the first instance of the microservice to the one or more tracking identifiers.

In another exemplary embodiment, the method further includes updating a log of messages sent or received by the first network node to include the message or an identifier of the message and the one or more tracking identifiers.

In another exemplary embodiment, each tracking identifier includes a host identifier and a port identifier associated with the corresponding network node.

In another exemplary embodiment, a first network node comprises a processor and a memory, the memory containing instructions executable by the processor whereby the processor is configured to, in a distributed microservice system having instances of one or more microservices operated by network nodes with each instance having a data cache operable to share data between instances of that microservice, sending, by a first instance of a microservice operated by a first network node, to a second instance of the same microservice operated by a second network node, an indication that includes a message to access certain data that may be available in a data cache of an instance of the microservice. Further, the indication also includes one or more tracking identifiers with each tracking identifier corresponding to an instance of the microservice that successively sends or receives the message so as to determine that the message corresponds to a same message previously sent or received by the same instance of the microservice based on the one more tracking identifiers of the message and the one or more tracking identifiers of the previous message.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
in a distributed microservice system having instances of one or more microservices operated by network nodes with each instance having a data cache operable to share data between instances of that microservice,
receiving, by a first instance of a microservice operated by a first network node, from a second instance of a same microservice operated by a second network node, an indication that includes a message to access data that may be available in a data cache of an instance of the microservice, wherein each instance is operable to send the access data message responsive to determining that the data is unavailable in the data cache of that instance, the indication also including one or more tracking identifiers with each tracking identifier corresponding to an instance of the microservice that successively receives the message so as to determine that the message corresponds to a same message previously received by the same instance of the microservice based on the one or more tracking identifiers of the message and the one or more tracking identifiers of the previous message.

2. The method of claim 1, further comprising:
updating a log of messages sent or received by the first instance to include the message or an identifier of the message and the one or more tracking identifiers of that message.

3. The method of claim 1, further comprising:
determining that the message corresponds to the same message received by the first instance based on the one or more tracking identifiers of the message and the one or more tracking identifiers of the previous message.

4. The method of claim 3, further comprising:
determining that at least one of the one or more tracking identifiers of the message corresponds to at least one of the one or more tracking identifiers of the previous message.

5. The method of claim 3, further comprising:
determining that a sequence of the one or more tracking identifiers of the previous message corresponds to a sequence of at least a portion of the one or more tracking identifiers of the message.

6. The method of claim 3, further comprising:
determining that content of the message corresponds to content of the previous message.

7. The method of claim 1, further comprising:
sending, by the first instance of the microservice of the first network node, to the second instance of the microservice of the second network node, an indication that the message is associated with an error condition.

8. The method of claim 7, wherein the error condition is associated with the same message being received by an instance of the microservice prior to that instance receiving a response to any of the sent or received messages.

9. The method of claim 7, wherein the error condition is associated with an infinite call loop.

10. The method of claim 1, further comprising:
sending, by the first instance of the microservice of the first network node, to the second instance of the microservice of the second network node, the data responsive to determining that the data is available in the data cache of the first instance of the microservice.

11. The method of claim 1, wherein each tracking identifier includes a host identifier and a port identifier associated with the corresponding instance of the microservice.

12. A first network node, comprising:
a processor and a memory, the memory containing instructions executable by the processor whereby the processor is configured to:
in a distributed microservice system having instances of one or more microservices operated by network nodes with each instance having a data cache operable to share data between instances of that microservice,
receive, by a first instance of a microservice operated by the first network node, from a second instance of the same microservice operated by a second network node, an indication that includes a message to access data that may be available in a data cache of an instance of the microservice, wherein each instance is operable to send the access data message responsive to determining that the data is unavailable in the data cache of that instance, the indication also including one or more tracking identifiers with each tracking identifier corresponding to an instance of the microservice that successively receives the message so as to determine that the message corresponds to a same message previously received by the same instance of the microservice based on the one more tracking identifiers of the message and the one or more tracking identifiers of the previous message.

13. A method, comprising:
in a distributed microservice system having instances of one or more microservices operated by network nodes with each instance having a data cache operable to share data between instances of that microservice,
in response to determining that data is unavailable in the data cache of a first instance of a microservice operated by a first network node, sending, by the first instance, to a second instance of a same microservice operated by a second network node, an indication that includes a message to access data that may be available in a data cache of an instance of the microservice, the indication also including one or more tracking identifiers with each tracking identifier corresponding to an instance of the microservice that successively receives the message so as to determine that the message corresponds to a same message previously received by the same instance of the microservice based on the one more tracking identifiers of the message and the one or more tracking identifiers of the previous message.

14. The method of claim 13, further comprising:
receiving, by the first instance of the microservice operated by the first network node, from a third instance of the microservice operated by a third network node, an indication that includes the message and a portion of the one or more tracking identifiers.

15. The method of claim 13, further comprising:
updating the one or more tracking identifiers to include a tracking identifier of the first instance to obtain updated tracking identifiers.

16. The method of claim 15, wherein the updating includes appending the tracking identifier of the first instance of the microservice to the one or more tracking identifiers.

17. The method of claim 13, further comprising:
updating a log of messages sent or received by the first network node to include the message or an identifier of the message and the one or more tracking identifiers.

18. The method of claim 13, wherein each tracking identifier includes a host identifier and a port identifier associated with the corresponding network node.

19. A first network node, comprising:

a processor and a memory, the memory containing instructions executable by the processor whereby the processor is configured to:

in a distributed microservice system having instances of one or more microservices operated by network nodes with each instance having a data cache operable to share data between instances of that microservice, in response to determining that data is unavailable in the data cache of a first instance of a microservice operated by the first network node, send, by the first instance, to a second instance of the same microservice operated by a second network node, an indication that includes a message to access the data that is available in a data cache of an instance of the microservice, the indication also including one or more tracking identifiers with each tracking identifier corresponding to an instance of the microservice that successively receives the message so as to determine that the message corresponds to a same message previously received by the same instance of the microservice based on the one more tracking identifiers of the message and the one or more tracking identifiers of the previous message.

* * * * *